United States Patent
Kundur Subramaniyan et al.

(10) Patent No.: US 8,497,605 B2
(45) Date of Patent: Jul. 30, 2013

(54) POWER SUPPLY ARRANGEMENT FOR INTEGRATED CIRCUIT CORE

(75) Inventors: Harish Kundur Subramaniyan, Eindhoven (NL); Rinze Ida Mechtildis Peter Meijer, Herkenbosch (NL)

(73) Assignee: NXP B.V., Eindhoven (NL)

( * ) Notice: Subject to any disclaimer, the term of this patent is extended or adjusted under 35 U.S.C. 154(b) by 439 days.

(21) Appl. No.: 12/891,482

(22) Filed: Sep. 27, 2010

(65) Prior Publication Data
US 2011/0127832 A1 Jun. 2, 2011

(30) Foreign Application Priority Data
Sep. 28, 2009 (EP) .................................. 09171538

(51) Int. Cl.
*G05F 3/06* (2006.01)
(52) U.S. Cl.
USPC ............................................................ 307/151
(58) Field of Classification Search
USPC ............................................................ 307/151
See application file for complete search history.

(56) References Cited

U.S. PATENT DOCUMENTS

| | | |
|---|---|---|
| 6,052,790 A | 4/2000 | Brown |
| 2007/0285952 A1 | 12/2007 | Zeng et al. |
| 2009/0174469 A1 | 7/2009 | Fallah et al. |

OTHER PUBLICATIONS

Pakbaznia, E. et al. "Charge Recycling in MTCMOS Circuits: Concept and Analysis," IEEE Design Automation Conf., pp. 97-102 (Jul. 24, 2006).
Henzler, S. et al. "Power Gating Techniques for Low Stand-By Power Consumption," Infineon Techns. & Techn. Univ. Munich, presentation given in Singapore, 48 pgs. (Mar. 29, 2006).
Extended European Search Report for European Patent Appln. No. 09171538.3 (Feb. 25, 2010).

*Primary Examiner* — Daniel Cavallari (57) ABSTRACT

A power supply arrangement is for supplying power to a chip core. A dc-dc converter arrangement is used both for a wake-up state of the core in preparation for an active state, and for a shut down charge recycling state in which the core supplies charge to the dc-dc converter. Thus, the dc-dc converter arrangement functions both to control powering on of the core in an efficient manner and the powering down of the core to implement charge recycling. In an active state, the core is supplied with power from the high power supply line.

15 Claims, 7 Drawing Sheets

POWER SUPPLY ARRANGEMENT FOR INTEGRATED CIRCUIT CORE

This application claims the priority under 35 U.S.C. §119 of European patent application no. 09171538.3, filed on Sep. 28, 2009, the contents of which are incorporated by reference herein.

FIELD OF THE INVENTION

This invention relates to power supply arrangements for integrated circuit cores, particularly but not exclusively for multiple power domain integrated circuits.

BACKGROUND OF THE INVENTION

The ongoing miniaturization of integrated circuit feature sizes has a significant impact on the chip's size, performance, and power consumption. With every advance in technology, the circuit performance is improved due to shorter transistor channel lengths, lower threshold voltages, and reduced gate-oxide thicknesses. These dimension reductions however lead to increased power leakage due to increased sub-threshold leakage and gate oxide tunnelling currents. For 90 nm and smaller technologies (which refers to the minimum feature size, such as channel length) leakage power becomes as important as dynamic switching power in many applications.

To reduce time to market, modern large system chips (system on chips—SoCs) are designed using pre-designed and pre-verified logic blocks called cores. A power domain in the SoC can contain one or more of these cores. To minimize the power dissipation, large SoCs require efficient power management. For that purpose, it is very common in practise to equip every power domain in the SoC with power switches to enable power gating functionality. Based on the activity in the SoC and the data transactions from a power domain, power domains can be individually turned off through the power switch. In this way, the leakage power is minimized for the power domain which is turned-off, thus, leading to savings in the overall power consumption. A power management unit implements the control function to turn-off and to turn-on power domains in the SoC.

Figure 1:
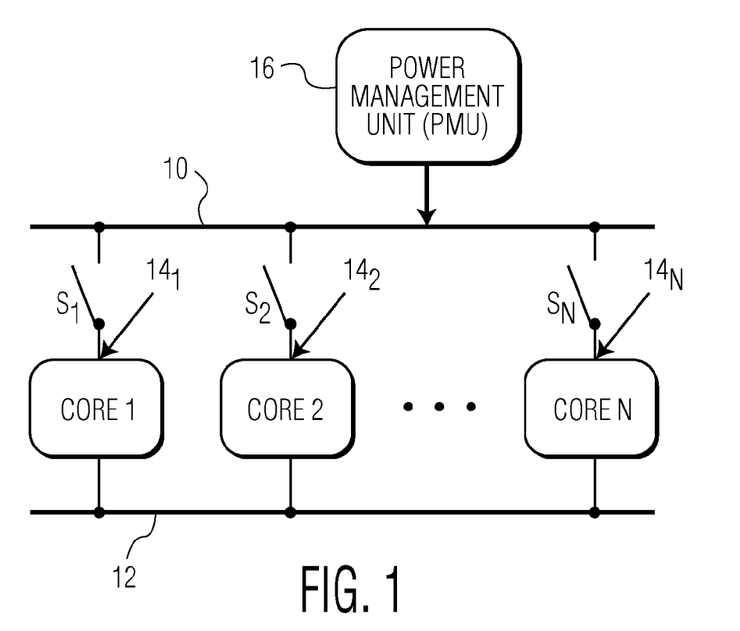
FIG. 1 shows a known example of power domain as part of a SoC with power gating functionality.

FIG. 1 shows an example power domain as part of a SoC with power gating functionality. The power switches of the cores are labelled $S_N$ for core number N. Each core is supplied from the main supply line 10. Its power supply is connected between the main power supply 10 and ground 12, with the power switch S between the main supply 10 and a respective supply node $14_N$ of each core N. This power management scheme is suitable for digital, analogue or mixed-signal cores. A power management unit (PMU) 16 controls the power domain; it is shown schematically with a single output. There may be multiple PMUs and they may have multiple control outputs.

When a power domain is power-gated, the circuit discharges to a reference potential, so that the charge of the inactive power domain is not effectively utilized. A more energy-efficient approach is to reuse this charge for functional operation, which leads to an increased autonomy for portable applications or sensor networks.

When a core is powered ON using the scheme shown in FIG. 1, typically only half the power delivered by the power management unit (PMU) 16 is used to charge (or power up) the core. The rest of the power is spent in heating up the switches. A better way to charge the core is to charge it up in steps. This may or may not be possible depending on the amount of time available to power up the core.

Pakbaznia E., Charge Recycling in MTCMOS Circuits: Concept and Analysis, DAC2006 showed a charge-recycling approach for power domains. The approach is to reduce the energy when switching between active and sleep modes of power domains, e.g. charge recycling is done to reduce the switching power consumption during the active-to-sleep and sleep-to-active transitions of two independent power domains. This approach is of very limited use, because it only makes sense to apply it when different cores are set to sleep (power-down) and to active (power-on) mode at about the same time.

SUMMARY OF THE INVENTION

According to the invention, there is provided a power supply arrangement for supplying power to a chip core, comprising:
a power controller for controlling the supply of power to the core;
a dc-dc converter arrangement connected to a high power supply line; and
a switching arrangement connected such that the core can be supplied with power from the high power supply line or from the dc-dc converter arrangement under the control of the power controller,
wherein the power supply arrangement is operable in:
an active state in which the core is supplied with power from the high power supply line;
a wake-up state in which the core is supplied with power from the dc-dc converter arrangement; and
a shut down charge recycling state in which the core supplies charge to the dc-dc converter arrangement.

In this arrangement, the core can be controlled to provide charge recycling through a dc-dc converter arrangement. During shut-down of the core, the dc-dc converter transports charge present on the supply node of the core to the main power supply. The dc-dc converter arrangement in this state functions to convert a variable (dropping) input voltage to a fixed output voltage.

The dc-dc converter arrangement is also used for waking up the core. In that case, the input voltage to the dc-dc converter is constant, and the output voltage ramps up. This ramping up can be controlled to provide an efficient powering on of the core.

In this way, the invention provides a charge recycling circuit implementation suitable for energy efficient circuit operation. It reuses the energy stored in cores that are powered down for use in other cores that are active. The invention avoids timing constraints imposed on the power-on/down transitions and provides a modular, flexible and efficient solution.

The core is typically a power gated power domain, and charge from the core is transported to the main supply of the SoC during the shut down state, such that the charge can be used for functional operations being executed in other active power domains (of a multi-core chip).

The charge recycling unit can be partly or completely integrated in the chip.

The invention makes use of the concept of charge recycling to improve energy-efficient chip operation in power-gated power domains. Dc-dc conversion is used both to implement charge recycling and for efficient power-on.

The power supply arrangement is preferably also operable in a standby state. In this case, the core can be supplied with power from the dc-dc converter arrangement or it can be disconnected from the power supply completely. If a stand-by voltage is to be maintained on the core, this can be regulated in known manner.

The dc-dc converter arrangement can comprise an inductive converter, having an inductor having a terminal cyclically switched between power levels during the shut down charge recycling state.

Alternatively, the dc-dc converter can comprise a capacitive converter. A combination can be used.

The power supply arrangement preferably further comprises a threshold detection circuit for comparing the core power supply voltage with a threshold, wherein the threshold determines when the shut down charge recycling state is complete. For example, the output of the threshold detection circuit is provided to a logic circuit which controls the dc-dc converter arrangement operation.

The switching arrangement can comprise a core supply switch in series with the core between one of the power supply lines and the core, and a charge recycle switch between the output of the dc-dc converter arrangement and the core.

The invention also provides a system on chip comprising a plurality of cores and a power supply arrangement of the invention. Each core can have a respective dc-dc converter arrangement and a respective switching arrangement. The power controller can be shared or there can be one per core.

The invention also provides a method for supplying power to a chip core, comprising:
in an active state of a core, supplying the core with power from a high power supply line;
in a wake-up state of a core, supplying power from a dc-dc converter arrangement in preparation for the active state; and
in a shut down charge recycling state, coupling the core to the dc-dc converter arrangement such that the core supplies charge to the dc-dc converter while the core supply voltage is dropped.

The dc-dc converter arrangement supplies the charge to the high power supply line to implement charge recycling.

BRIEF DESCRIPTION OF THE DRAWINGS

An example of the invention will now be described in detail with reference to the accompanying drawings, in which.

DETAILED DESCRIPTION OF EMBODIMENTS

Figure 2:
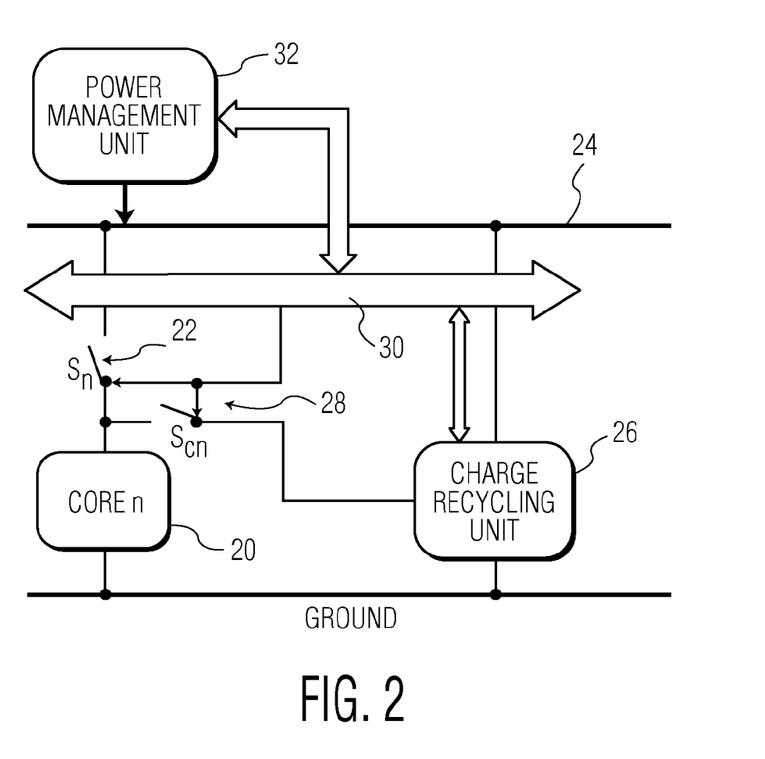
FIG. 2 shows in schematic form a generic outline of the system of the invention.

The invention provides a power supply arrangement for supplying power to a chip core. A dc-dc converter arrangement is used both for a wake-up state in preparation for an active state, and for a shut down charge recycling state in which the core supplies charge to the dc-dc converter arrangement. The dc-dc converter arrangement routes the charge to the main supply. Thus, the dc-dc converter arrangement functions both to control powering on of the core in an efficient manner and the powering down of the core to implement charge recycling. In an active state, the core is supplied with power from a high power supply line FIG. 2 shows in schematic form a generic outline of the system of the invention. Only one core 20 (Core n) is shown.

The core 20 is supplied through a power supply switch Sn (22) from the main supply 24. In addition, a charge recycling unit 26 is connected to the power supply input of the core 20 through a charge recycling switch Scn (28). The charge recycling unit 26 is powered from the main supply 24.

The two switches are controlled by commands from a power control bus 30 under the ultimate control of the power management unit 32.

Figure 3:
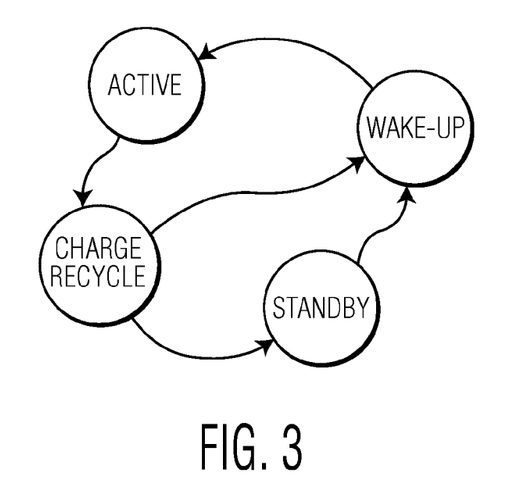
FIG. 3 shows a simplified state diagram of the power states of the core.

FIG. 3 shows a simplified state diagram of the power states of the core n. The states are an active state with the core operational, a charge recycling state used when powering down the core, a standby state with the core powered down and a wake-up state in which the core is powered up.

During the active state, the switch Sn is ON and the core performs its normal function (the inputs and outputs of the core are not shown). When the core is to be powered down, Sn is open and the charge-recycling switch, Scn, is turned ON and the charge recycling state begins.

During this state, the charge stored in the core's capacitance is pumped back into the supply. This charge would otherwise leak away to the ground due to leakage mechanisms in the core. After the discharge of the core supply is complete to the required level (VL), the core enters the standby mode where Sn remains open and Scn can be optionally open or close.

Figure 5:
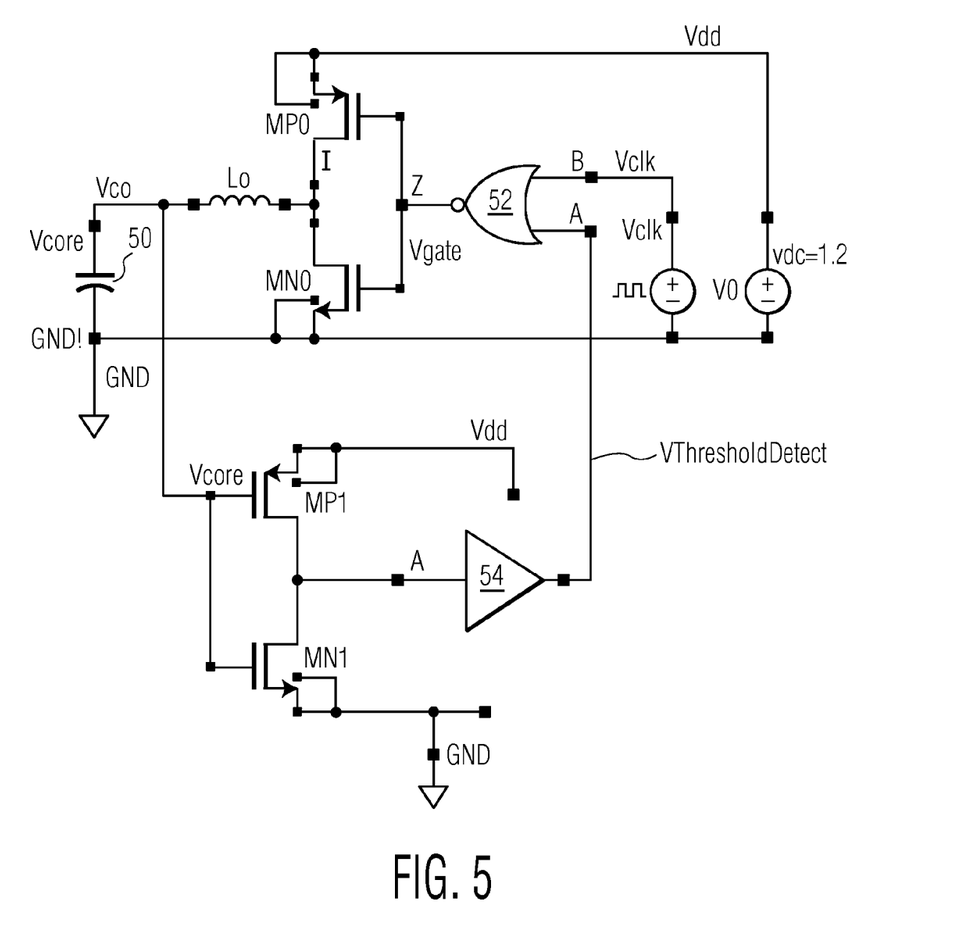
FIG. 5 shows an implementation of a charge recycling unit using an inductive dc-dc converter, and in charge recycling configuration.
Figure 7:
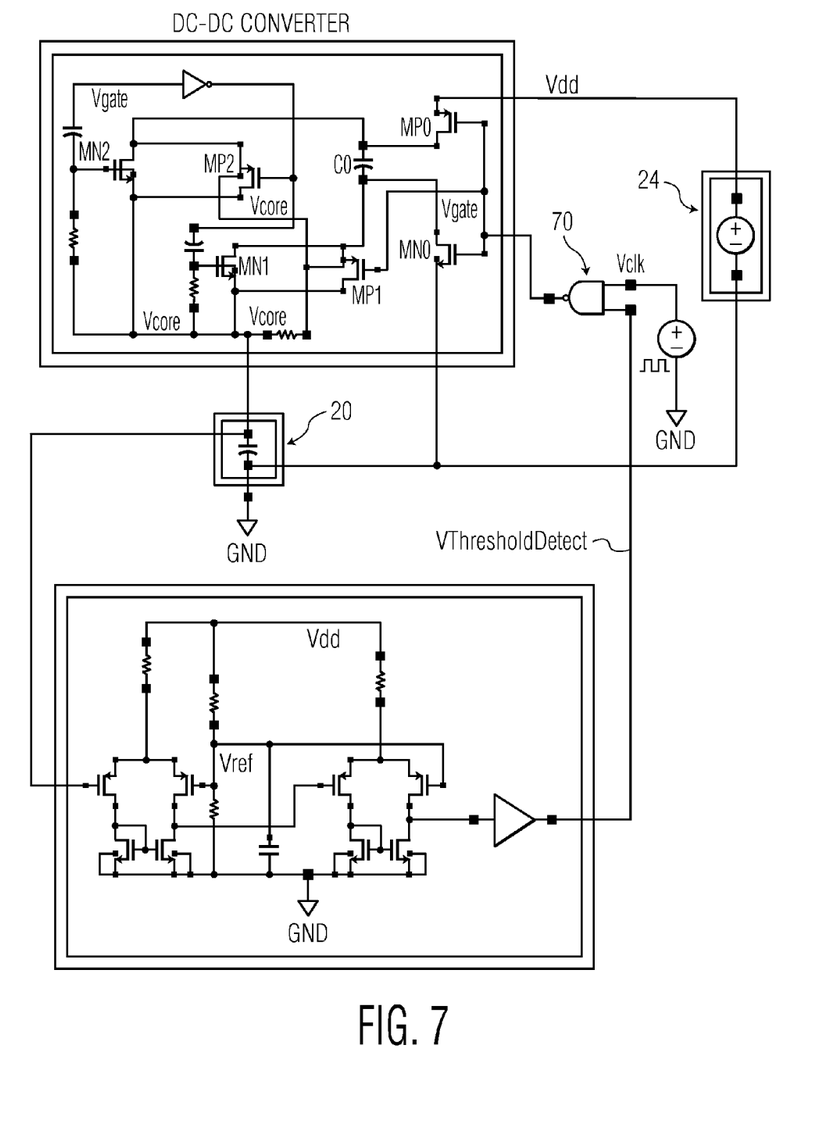
FIG. 7 shows a converter based on a capacitive voltage doubler.

The required VL level detection (for determining the state of the core) is a part of the charge-recycling unit 26. In particular, the voltage level VL is obtained by observing the core supply voltage. Thus, VL is derived from the main supply without the need for an additional reference voltage source; VL is processed in the threshold voltage detection portion (for example as shown in FIGS. 5 and 7 described below).

After the core enters into standby mode or during the charge-recycling mode, it is quite likely that the core is required to enter the active state. Thus, the charge recycle state and the standby state can make a transition to the wake-up state. If the core has to be charged in a very short time, Scn is opened and Sn is closed immediately. If the core has to be charged in a finite amount of time but in an efficient way, the charging can be done in steps through the charge recycling unit and then Scn can be opened and Sn closed. These different possible charging or powering-up processes of the core are part of the wake-up state.

It is noted that FIG. 2 shows header power switches (i.e. between the core and the main power line). Footer power switches could be used (i.e. between the core and the ground line). The switch Scn is placed in corresponding manner. It is also possible to use both header and footer switches and use either one or two charge recycling switches Scn.

In all cases, the energy stored in the core is recycled and fed back into the main supply during power-down and the switches Scn are used to power-on the core efficiently during the wake-up state before going to the active state.

Figure 4:
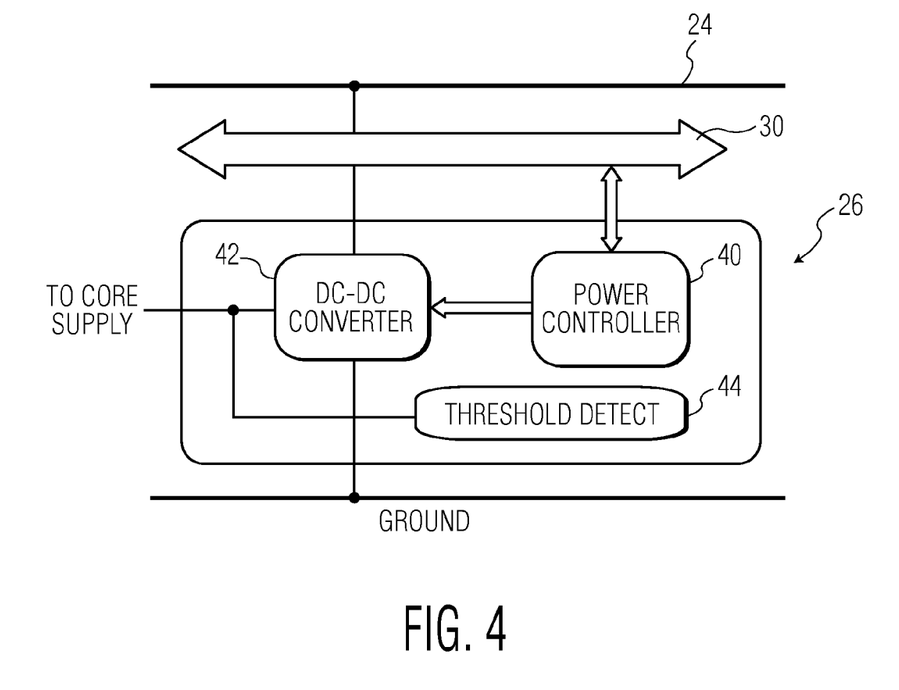
FIG. 4 shows an embodiment of the charge-recycling unit used in the system of FIG. 2.

FIG. 4 shows an embodiment of the charge-recycling unit 26. Again, the unit is controlled by commands from a power control bus 30 under the ultimate control of the power management unit.

There can be more than one of these charge recycling units 26 in a single SoC. The unit contains a power controller 40 that controls a dc-dc converter 42. In addition to the dc-dc converter 42, a threshold detection unit 44 is provided that helps to sense the core supply to stop/start/continue the charge recycling.

The converter 42 is powered by the main supply 24 that typically has a constant supply voltage. The dc-dc converter can be capacitive or inductive or hybrid.

The voltage supplied to the core during power-on can vary between the main supply value and the ground potential depending upon the state of charging of the core supply. Thus, the dc-dc converter has a constant input and a variable controllable output voltage. It is known that capacitive dc-dc converters do not perform efficiently if the voltage conversion ratio is varying but they exhibit advantages of low area and complete integration on a single die. Inductive dc-dc converters are more efficient but have difficulty of full integration on chip.

A charge-recycling unit 26 can be shared by multiple cores, or each of the cores could have a dedicated charge recycling unit. Each of the charge recycling units can be individually activated.

FIG. 5 shows an implementation of a charge recycling unit using an inductive dc-dc converter, and in charge recycling configuration.

FIG. 5 does not show the power controller but it is assumed that the controller has already issued the command to start the charge recycling.

The core is modelled as a 1 nF capacitor 50 with initial voltage of Vcore=1.2V. The dc-dc converter is itself made up of the switches MP0 and MN0 and the coil Lo and a NOR gate 52 used to drive the switches.

More sophisticated control of the gates could be used to achieve more efficient conversion. The switching is done at the clock frequency Vclk (the clock signal being applied to one input of the NOR gate).

Threshold detection is implemented using a highly asymmetric inverter (MP1 and MN1) followed by a buffer 54. The threshold detection signal is applied to the other input of the NOR gate.

The stand-by voltage level VL for the core is obtained by observing the core supply voltage in the threshold detection part. For example, transistors MP1 and MN1 form an inverter which outputs a logic '0' until its input (the core voltage) is below the switching threshold of the inverter. When the core voltage is lower than the switching threshold voltage of the inverter, then VL is reached.

Thus, the NOR gate output is only high when the threshold detection signal is low and the clock signal is low. When the threshold detection signal is high, the NOR gate output is constant (low). When the threshold detection signal is low, the NOR gate output cycles with the clock signal, for controlling the dc-dc converter in cyclic manner.

The main supply is modelled by a constant voltage source V0.

Figure 6:
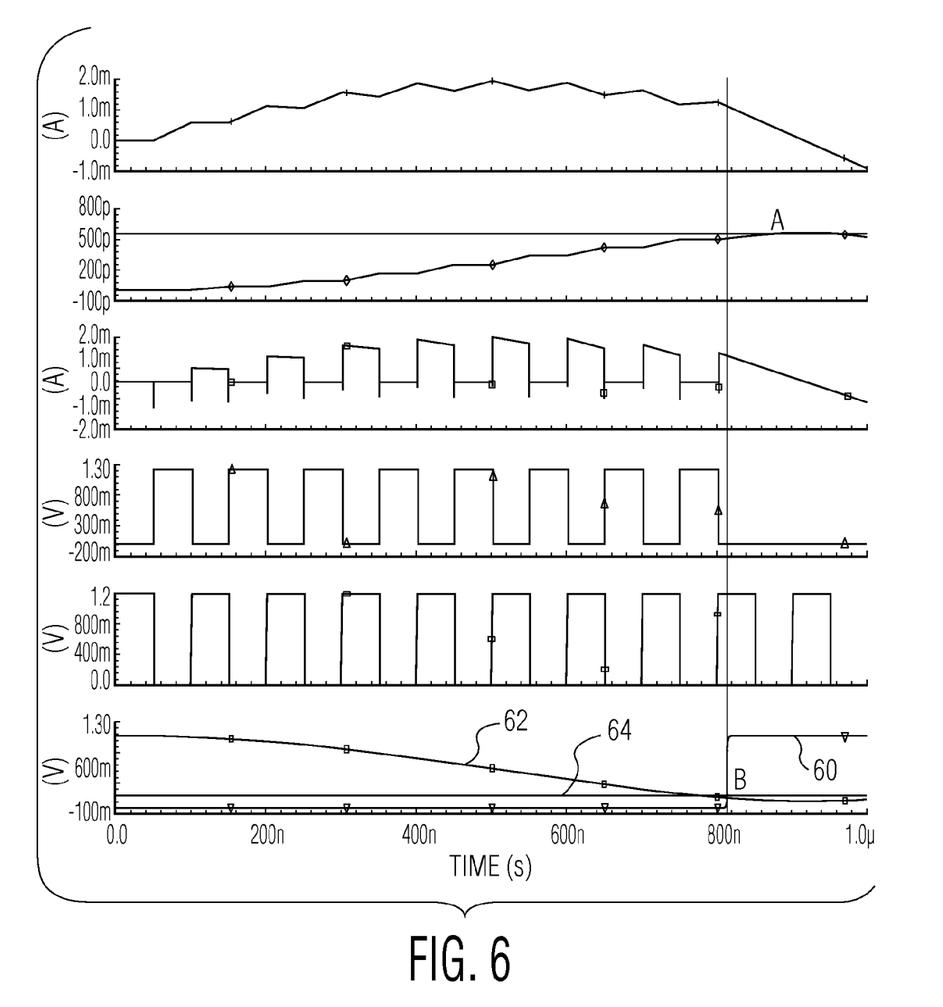
FIG. 6 shows a transient simulation results in waveforms shown in FIG. 6.

A transient simulation results in waveforms shown in FIG. 6.

The first (top) waveform shows the inductor Lo current. The third waveform shows the current flowing into the main supply Vdd and the second waveform shows its time integral which represents the recycled charge.

The fourth waveform shows the gate voltage Vgate at the output of the NOR gate. The fifth waveform shows the clock signal Vclk, which is applied to one input of the NOR gate. The last (sixth) waveform shows the threshold detection signal VThresholdDetect (this is the signal 60 that switches from 0 to 1 at around 800 ns) as well as the buffer input voltage (the decaying waveform 62) and the threshold 64. The recycling function is ended at 800 ns which is when Vcore has reached the voltage level to be applied to the core by the dc-dc converter during the standby mode.

The stand-by voltage level is determined in this case by the internal logic level (or switching threshold) of the inverter MP1-MN1. This voltage is derived from the main supply and transistor properties of MP1-MN1.

Even with such simple converter architectures, simulations show a energy conversion efficiency of more than 90%.

The main disadvantage of the inductive converter implementation is the requirement for an inductor. In many cases it is not possible to integrate it on chip. This leads to increase in system cost. The above disadvantage can be overcome at the cost of efficiency by using capacitive dc-dc converters.

There are many types of capacitive converter and they could be made quite complex to improve efficiency.

FIG. 7 shows a converter based on a voltage doubler used for the charge recycling state. Of course, a voltage tripler or any other generic voltage multiplier for the dc-dc converter can be used.

When a value of VL is selected as half the VDD voltage, this implies that if the core voltage started at the full supply voltage, the core can only be discharged to half the supply voltage. This means that only 75% of the energy stored in the core can be recycled. Converters that use varying multiplication factors can be used depending on the voltage of the core to achieve higher efficiencies.

The capacitive converter is quite complex compared to the inductive converter. FIG. 7 does not show the power controller but it is again assumed that the controller has already issued the command to start the charge recycling. The energy storage element is Co. The other capacitors are used to provide boost of the gate voltages for the switches used in the converter.

The transistors MP0 and MN0 control the charging and discharging of the capacitor Co. The gates of these transistors are controlled by a logic circuit which in the example shown comprises a NAND gate 70. The NAND gate has as inputs the clock signal and a threshold detect signal from the threshold detection circuit. Thus, while the threshold detect signal is high, the transistors are gated with a signal which is the inverse of the clock signal. This implements a cyclic charge pumping operation for the dc-dc conversion. The core supply voltage is driven to half the main supply voltage, and excess charge is returned to the main supply.

The circuit of FIG. 7 cyclically switches the capacitor Co to be in series with the core capacitance (between the Vdd and ground) and in parallel with the core capacitance.

Figure 8:
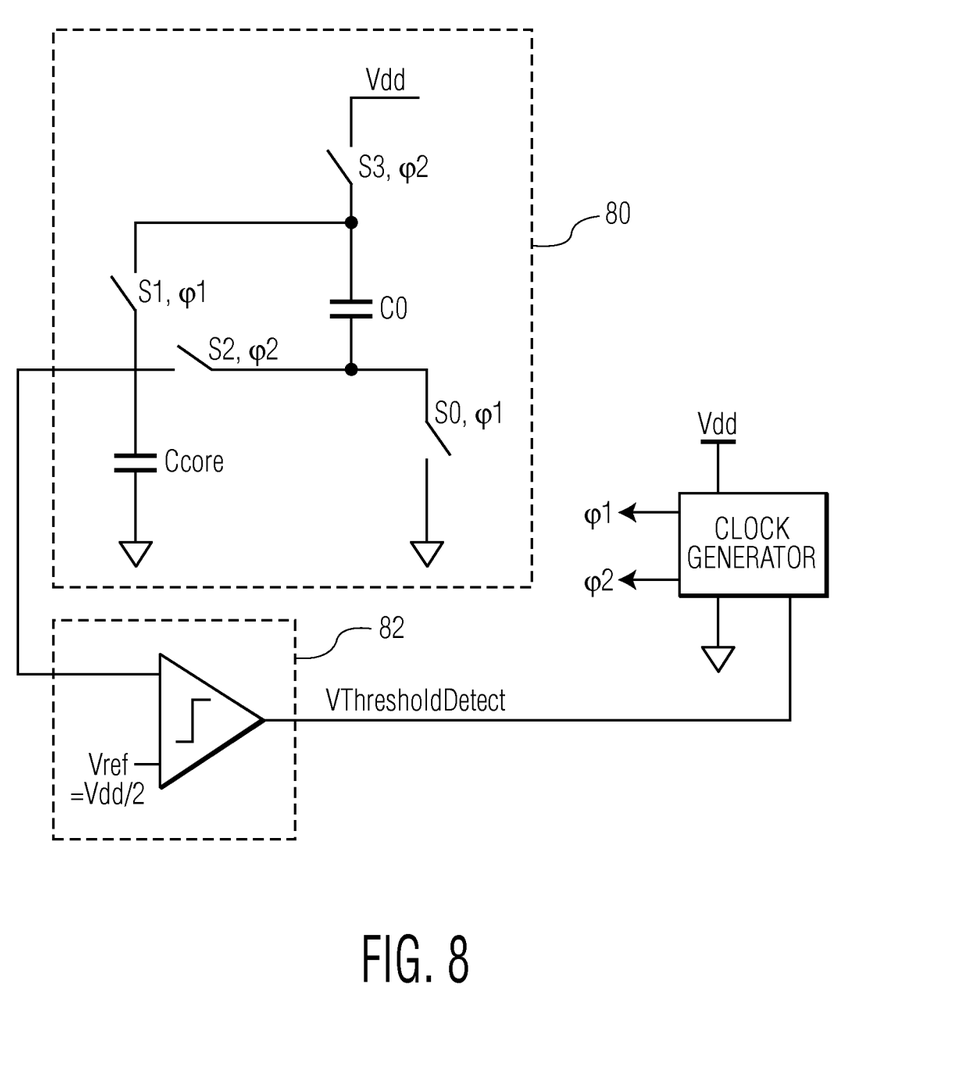
FIG. 8 shows a simplified version of the circuit of FIG. 7.

FIG. 8 is a simplified schematic of FIG. 7 to explain the circuit operation. The dc-dc converter is part 80 and the threshold detection is part 82. In the dc-dc converter, switch S0 represents transistor MN0 between the base of the capacitor Co and ground. Switch 51 represents the function of transistors MN2 and MP2. Switch S2 represents the function of transistors MN1 and MP1. Switch S3 represents transistor MP0 between the top of the capacitor Co and the supply Vdd.

During phase φ1, the switches S1 and S0 are closed and S2 and S3 are open. Co is in parallel with Ccore so that Co is charged to Vcore implementing charge sharing between the two capacitors.

During phase φ2, the switches S2 and S3 are closed and S0 and S1 are open. Co is in series with Ccore and Co is charged by the power line Vdd. This charging and charge redistribution takes place cyclically.

The threshold detection part 82 is essentially a voltage comparator which can be made with a cascade of amplifiers as shown in FIG. 7, or with clocked circuits. The details are not relevant to the invention.

Figure 9:
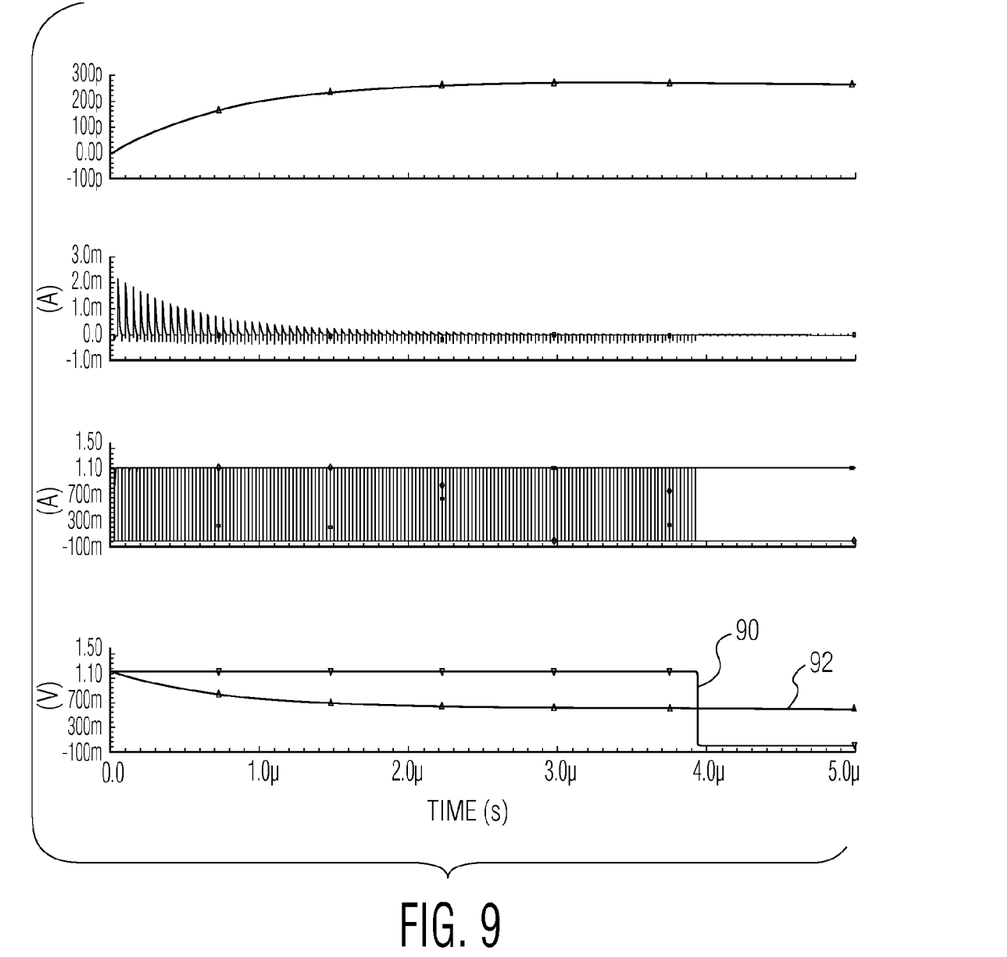
FIG. 9 shows simulation waveforms of the charge recycling process using the capacitive converter shown in FIG. 7.

FIG. 9 shows simulation waveforms of the charge recycling process using the capacitive converter shown in FIG. 7.

The second waveform shows the current flowing into the main supply Vdd and the top waveform shows its time integral which represents the recycled charge.

The third waveform shows the gate voltage Vgate at the output of the NAND gate and used to control the cyclic charging and discharging of the main charge storage capacitor Co.

The last (fourth) waveform shows the threshold detection signal VThresholdDetect (this is the signal 90 that switches from 1 to 0 at around 4 us) as well as the buffer input voltage (the decaying waveform 92). The recycling function is ended at 4 us which is when Vcore has reached the voltage level to be applied to the core during the standby mode.

The capacitive converter exhibits an efficiency of around 45%. This is low compared to that of the inductive converter which exhibits greater than 90% efficiency but the area is quite compact. The total capacitance used in this design simulation was less than 20 pF in total. The circuit implementation will require about 0.003 mm2 in 65 nm CMOS technology. The inductive converter might require an external coil for good efficiency. The choice of the converter depends on the cost efficiency trade-offs involved in the system design.

The operation of the dc-dc converter is not described in further detail, as this does not form part of the invention. Indeed many different designs of inductive or capacitive dc-dc converter can be used. In all cases, the converter steps a voltage down from the main supply voltage. This process is implemented by a cyclic control of the flow of charge. The charge flow during the period when the output voltage is being lowered flows to the main supply line, providing a charge recycling effect.

The waveforms above relate to the power-off function, when charge recycling takes place. During this time, the supply voltage to the core drops until a reference voltage is reached.

The power-on function can be implemented by reversing the roles of the input and output of the converter. Thus, in the power-off cycle, the dc-dc converter has a variable (dropping) output voltage and a constant input voltage. The drop in charge stored as the voltage is lowered causes a charge flow to the power supply line. In the power-on cycle, there is a variable (rising) output voltage of the dc-dc convertor and a fixed input voltage (the power supply line voltage).

The power-on function implemented during the wake-up state is not described in detail, but efficiencies similar to that during charge recycling can be achieved.

In the wake-up state, a voltage down conversion is used to charge to core to a desired level. For example a voltage halving circuit can be used to charge the core to the half-Vdd level. This can be implemented by a different circuit to the dc-dc converter used for the charge recycling. In this way, the stand-by voltage VL does not need to be constrained to be the same as the voltage used for efficient power-on (half of the supply voltage Vdd in this example). Different values van be used that are related to the choice of dc-dc converter topology. It is in fact more energy-efficient to charge the core to a higher voltage than half-Vdd during the wake-up state. This can be done by choosing a different value for the output of the down converting dc-dc converter.

Indeed, the dc-dc converter for powering on can be controlled in various ways during the power-on cycle, to give the most efficient power up cycle. In the examples above, the dc-dc converter provides a single intermediate output voltage to which the core is charged before the main power supply line is switched to the core. However, the dc-dc converter can be controlled to provide multiple staged voltage levels at the core with a desired function over time. The efficiency of the power-on cycle can be selected based on the time available for powering on the core. The levels can be different for different cores and can be adaptive.

A simpler dc-dc converter can be used for the powering on function, for example a simple capacitor network. The two dc-dc converters then can together be considered to be a "dc-dc voltage converter arrangement". The output voltage in the powering on stage can then be independent of the standby voltage in the powering down stage. For example the output voltage in the powering on stage can be 2 Vdd/3 or 3 Vdd/4 for example.

The detailed design of a simpler dc-dc converter for the powering on function has not been given as this will be routine to those skilled in the art. Of course, the same converter can be used for both functions as mentioned above, by reversing the input/output designation of the dc-dc converter.

The invention provides increased circuit autonomy. A simple power control function can be implemented with no additional computational effort required. The timing behaviour of power-on and power-off switching is thus unconstrained.

The invention provides a scalable solution, supporting multiple power domain chips. Simultaneous charge recycling of independent power domains can be achieved using multiple charge recycling units.

Full integration in to the SoC is possible in case of a capacitive charge recycling unit. The invention can be implemented with low area overhead and is compatible with traditional power switch implementations; thus there is no limitation on the type of power switch used (header or footer).

The invention can be used in a single core chip, and it provides efficient power-on as well as return of charge to the power supply for other circuits during power-down. However, the invention is of particular interest for any multi-domain IC. It is particularly useful in those ICs where multiple power domains have been used and where low power is required.

The invention is of particular interest for applications where infrequent core operation is needed, for example for periodic sensor measurements.

Various modifications will be apparent to those skilled in the art.

The invention claimed is:

1. A power supply arrangement for supplying power to a core of a chip, comprising:
   a power controller for controlling a supply of power to the core;
   a dc-dc converter arrangement connected to a high power supply line; and
   a switching arrangement connected such that the core can be supplied with power from the high power supply line or from the dc-dc converter under the control of the power controller,
   wherein the power supply arrangement is operable in:
   an active state in which the core is supplied with power from the high power supply line;

a wake-up state in which the core is supplied with power from the dc-dc converter arrangement in preparation for the active state; and a shut-down charge recycling state in which the core supplies a charge to the dc-dc converter arrangement.

2. An arrangement as claimed in claim 1, wherein the power supply arrangement is operable in a standby state after the shut-down state.

3. An arrangement as claimed in claim 1, wherein the dc-dc converter arrangement comprises one of an inductive dc-dc converter, a capacitive dc-dc converter, and a combination thereof.

4. An arrangement as claimed in claim 1, further comprising a threshold detection circuit for comparing the core power supply voltage with a threshold, wherein the threshold corresponds to completion of the shut-down charge recycling state.

5. An arrangement as claimed in claim 4, wherein the output of the threshold detection circuit is provided to a logic circuit which controls the dc-dc converter arrangement operation.

6. An arrangement as claimed in claim 1, wherein the switching arrangement comprises, a core supply switch in series with the core between one of the high power supply line and a low power supply line, and the core, and a charge recycle switch between the output of the dc-dc converter arrangement and the core.

7. A system on chip comprising a plurality of cores and a power supply arrangement as claimed in claim 1.

8. A system as claimed in claim 7, wherein each core has a respective dc-dc converter arrangement and a respective switching arrangement.

9. A system as claimed in claim 1, wherein the dc-dc converter arrangement comprises a first dc-dc converter for the wake-up state and a second dc-dc converter for the shut-down charge recycling state.

10. A method for supplying power to a chip core, comprising:

in an active state of a core, supplying the core with power from a high power supply line;

in a wake-up state of a core, supplying power from a dc-dc converter arrangement in preparation for the active state; and in a shut-down charge recycling state, coupling the core to the dc-dc converter such that the core supplies charge to the dc-dc converter arrangement while a core power supply voltage is dropped.

11. A method as claimed in claim 10, further comprising:
placing the core in a standby state after completion of the shut-down state.

12. A method as claimed in claim 10, further comprising comparing the core power supply voltage with a threshold, wherein the threshold corresponds to completion of the shut-down charge recycling state.

13. A method as claimed in claim 12, wherein an output of the threshold comparing is provided to a logic circuit which controls the dc-dc converter operation.

14. A method as claimed in claim 10 for supplying power to multiple cores of a system on chip.

15. A method as claimed in claim 10 wherein in the wake-up state of the core, power is supplied from a first dc-dc converter of the dc-dc converter arrangement and in the shut-down charge recycling state, the core is coupled to a second dc-dc converter of the dc-dc converter arrangement.

* * * * *